United States Patent [19]
La Mers

[11] 3,810,563
[45] May 14, 1974

[54] PLASTIC MELTING AND FEEDING MACHINE

[76] Inventor: Herbert La Mers, 2514 Greencastle Ct., Oxnard, Calif. 93030

[22] Filed: July 14, 1972

[21] Appl. No.: 271,771

[52] U.S. Cl. .............. 222/146 R, 222/14, 222/63, 222/55
[51] Int. Cl. ............................................. B67d 5/62
[58] Field of Search .......... 222/146, 269, 271, 311, 222/14, 63, 55; 425/149, 376, 378; 249/111; 72/202, 251; 219/421; 126/343.5 A; 432/8, 59; 401/2

[56] References Cited
UNITED STATES PATENTS

| | | | |
|---|---|---|---|
| 3,337,093 | 8/1967 | Mewton | 222/146 |
| 3,653,552 | 10/1969 | Ash | 126/343.5 A |
| 3,649,147 | 3/1972 | Fritsch | 425/376 |
| 2,678,752 | 5/1954 | West | 222/63 |
| 2,819,493 | 1/1958 | Hawtin et al. | 425/378 |
| 3,205,838 | 9/1965 | Frobeen et al. | 425/376 |
| 3,674,407 | 7/1972 | Neuhaus | 425/378 |
| 3,158,899 | 12/1964 | Demeter | 425/378 |

Primary Examiner—Stanley H. Tollberg
Assistant Examiner—H. Grant Skaggs
Attorney, Agent, or Firm—Lindenberg, Freilich & Wasserman

[57] ABSTRACT

A simplified plastic extruder structure is provided having a wide and thin intake passage to receive wide and thin feedstock. A series of pairs of rollers are mounted in and spaced along the wide walls of the intake passage. Feedstock inserted into the passage is propelled therealong with great force. The intake passage and rollers are kept cold. The intake passage leads, through a short transition passage, into a hot heating passage. Feedstock is forced into the hot heating passage wherein it is melted and from which it can be extruded through an exit orifice. The short transition passage between the cold intake passage and hot heating passage is tapered to be larger at the hot passage end so that any back flowing material is chilled and forms a good pressure seal at the smaller end and yet does not seize through friction when it re-expands, as it is returned to the hot heating passage.

6 Claims, 8 Drawing Figures

PLASTIC MELTING AND FEEDING MACHINE

BACKGROUND OF THE INVENTION

This invention relates to plastic extruders which supply molten plastic under pressure for further processing.

Conventional extruders consume granular feedstock which is slightly less expensive than strip feedstock. However, the cost of these extruders is quite high. They are large in size, and require complex bulk material handling equipment. As the granular feedstock melts, large quantities of entrapped air have to be expressed from the material. Because of frictional and shear induced heat, conventional extruders need to be run at a constant rate. They are troublesome when stopped or started or when run at various rates of output. They are also vulnerable to accidents caused by foreign objects in the granular feedstock.

OBJECTS AND SUMMARY OF THE INVENTION

An object of this invention is to provide a new plastic extruder which is free of the defects of the presently employed plastic extruders.

Another object of this invention is to provide a simple to operate compact, low cost plastic extruder.

Yet another object of this invention is the provision of a unique plastic extruder.

These and other objects of the invention are achieved in a structural arrangement wherein strip feedstock is fed into a wide and thin intake passage which conforms loosely to the incoming feedstock.

Strip feedstock enters an intake passage which is wide and thin, to conform loosely to the incoming feedstock. Recessed in opposite sides of the intake passage are successive pairs of serrated rollers set more closely together than the thickness of the feedstock. The pairs of rollers are all driven at the same speed by a motor and drive train. The intake passage and rollers are kept cold by water passages in the walls of the passage. The exit of the cold intake is bolted directly to the heating passage, repeated by a thick temperature insulating gasket. The hot heating passage is several times larger in cross sectional area than the incoming feedstock, permitting a reduction in velocity, and corresponding time to absorb heat, from the heated walls which are maintained at substantially the working temperature of the plastic. An orifice or valve is located at the end of the heating passage opposite the intake passage, for delivery of the plastic.

A transition passage is comprised of the final portion of the cold intake passage, and also the insulating gasket. It is tapered so as to be larger at the hot end. This permits the molten pressurized plastic to flow backwards and freeze in the tapered passageway, forming an excellent and constantly renewed seal against leakage; yet it will not seize when it re-expands, while still solid, as it moves back to the hot chamber.

The advantages of this invention over a conventional extruder derive from its ability to use a feedstock which is a continuous wide flat strip. Typically, this strip might be ⅛ inch thick and 6 inches or 12 inches wide. Such a form of material offers, a convenient form of supply — simply coils or rolls as in sheet steel. Because of the feedstock's high surface area to internal volume ratio, it is possible to propel it with great force in pounds per square inch of cross section without damaging the surface by the traction applied. Because the feedstock is thin, applied heat can rapidly penetrate throughout its mass. This is particularly important in heating materials like plastics, because they are slow heat conductors and cannot tolerate heat for very long periods, or at a temperature much in excess of their required exit temperature. This invention can produce very large quantities of evenly heated melted plastic per hour at very high pressure, and yet can be stopped or started at will, and operated at many different output rates, to suit the demand.

The novel features of the invention are set forth with particularity in the appended claims. The invention will best be understood from the following description when read in conjunction with the accompanying drawings.

BRIEF DESCRIPTION OF THE DRAWINGS

FIG. 8 is a partially schematic and perspective view of another embodiment of the invention.

DESCRIPTION OF THE PREFERRED EMBODIMENTS

Figure 1:
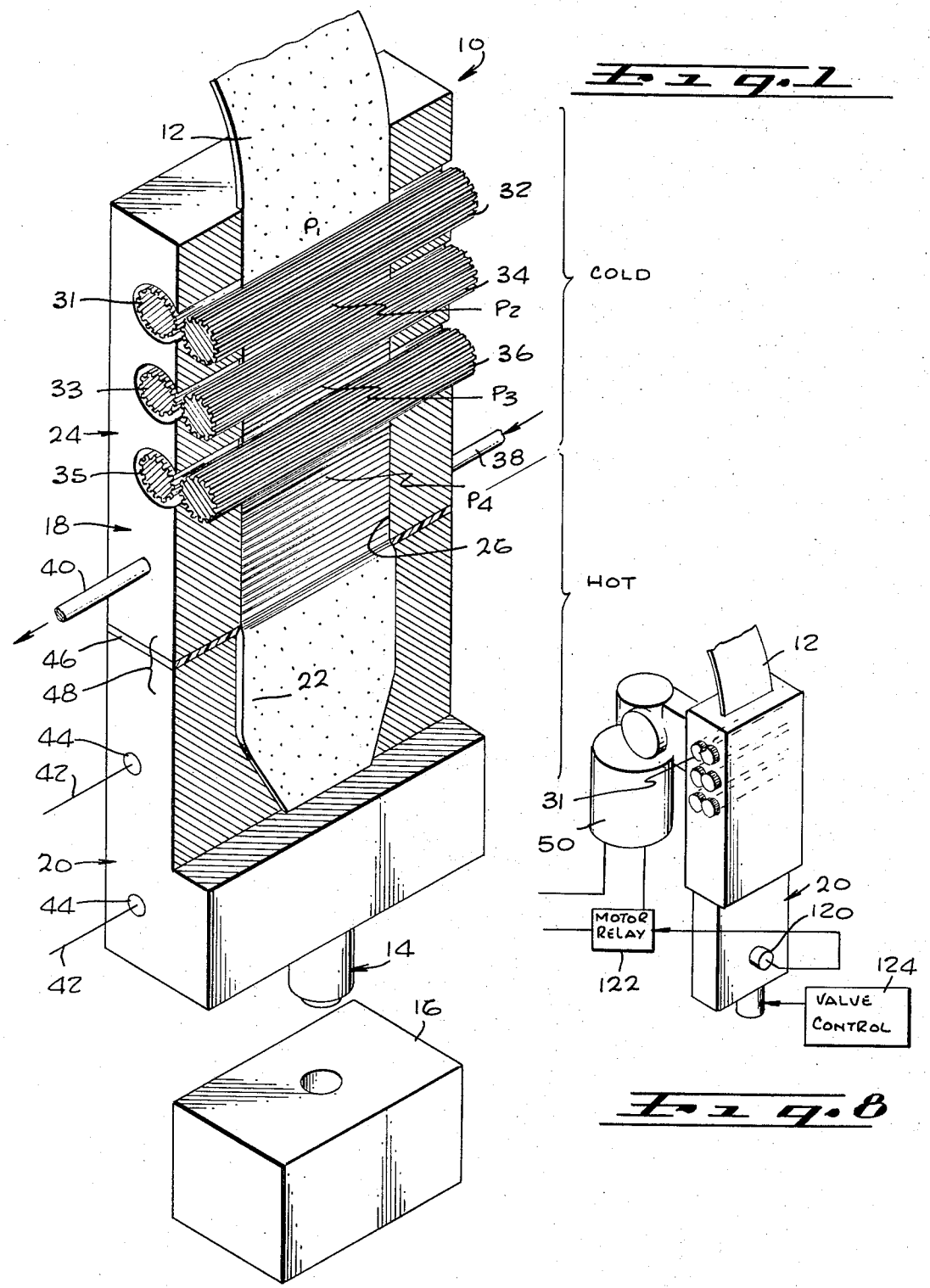
FIG. 1 is a simplified perspective view of the plastic feeding machine of the invention, showing how it operates.

FIG. 1 illustrates an extrusion or feeding machine 10 which receives a continuous strip of plastic feedstock 12, and which dispenses the plastic in a molten and highly pressured state from a nozzle 14. The plastic emitted from the nozzle may be injected into a die 16 for forming into an article of predetermined shape. By way of example, the machine illustrated is used to perform blow molding to manufacture containers of a shape determined by the die 16 which is a bottle mold. However, the machine can be constructed with a nozzle that provides plastic material for simple injection molding, for extruding of plastic through an extruding die, or for other similar applications where plastic is required which is heated and highly pressured.

The machine 10 includes a frame 18 with a chamber portion 20 defining a chamber 22 for containing heated and pressured plastic, and a feeding portion 24 defining a feed path 26 along which the strip feedstock 12 extends prior to entering the chamber. The chamber is shown as having a larger cross section than the feed path, but this is not necessary. A series of splined rollers 31–36 are positioned along the feed path 26 to drive the feedstock 12 into the chamber 22. Each pair of rollers can add an incremental pressure to the feedstock so that the series of rollers can raise the pressure from an initial low level $P_1$ to a level $P_2$ such as 1,000 psi, while the next set of rollers 33, 34 may raise the pressure to level $P_3$ such as 2,000 psi and the third set 35, 26 may raise the pressure to a level $P_4$ such as 3,000 psi. Cooling water passing through pipes 38, 40 keep the feed path region 24 of the frame cool. Such cooling is required to carry away some of the heat conducted to the passageway portion from the hot chamber portion 20 of the frame. The chamber portion 20 of the frame may be heated in any suitable manner, such as by electrical currents flowing through wires 42 that lead to cartridge heaters 44 in the frame. The cartridge heaters maintain the chamber at a high enough temperature to keep the plastic substantially molten so that it can readily flow out of the nozzle. The chamber portion 20 and passageway portion 24 of the frame are separated by an insulator 46, to minimize the transfer of heat between them.

The walls of the passageway 26 are formed to closely surround the strip-shaped feedstock 12. However, some space around the plastic strip cannot be avoided, and molten and pressurized plastic from the hot chamber 22 can leak upwardly around the strip towards the passageway 26. There is a transition region 48 of the frame near the insulator 46, where the temperature of the frame varies from below to above the melting point of the plastic material. Many plastics do not have a precise melting point, but rather a range of melting temperature. During operation of the machine, plastic, which leaks backwards from the chamber 22 toward the passageway 26, may solidify in the transition region 48. If the walls of the passageway or chamber are straight, then any plastic which solidifies at the transition region could tightly grip the walls of the frame and greatly resist movement therealong, as it re-expands from increasing temperature. This could prevent any further movement of plastic feedstock towards the hot chamber 22.

To prevent such blocking, the inner walls of the frame are tapered at the transition region 48. An angle of taper is utilized which causes the plastic to be self-releasing. That is, the angle is large enough so that the plastic can be moved toward the chamber 22 without requiring breaking or deformation of the solidified plastic. The angle which is required depends largely on the coefficient of friction between the plastic and the walls of the frame at the transition region, but generally an angle of more than 15° will be sufficient to provide a self-releasing taper. The construction of the frame therefore provides automatic sealing of the heated chamber 22 against the leakage of plastic out of its entrance, even though there is a space between the feed stock and walls of the feeding passageway. As described, this is accomplished by allowing the first portion of leaking plastic to form a cold seal that prevents any further leakage. The tapering of the frame prevents the solidified plastic from locking into position and blocking the further movement of feed stock into the chamber, as it re-expands, before again melting.

Figure 2:
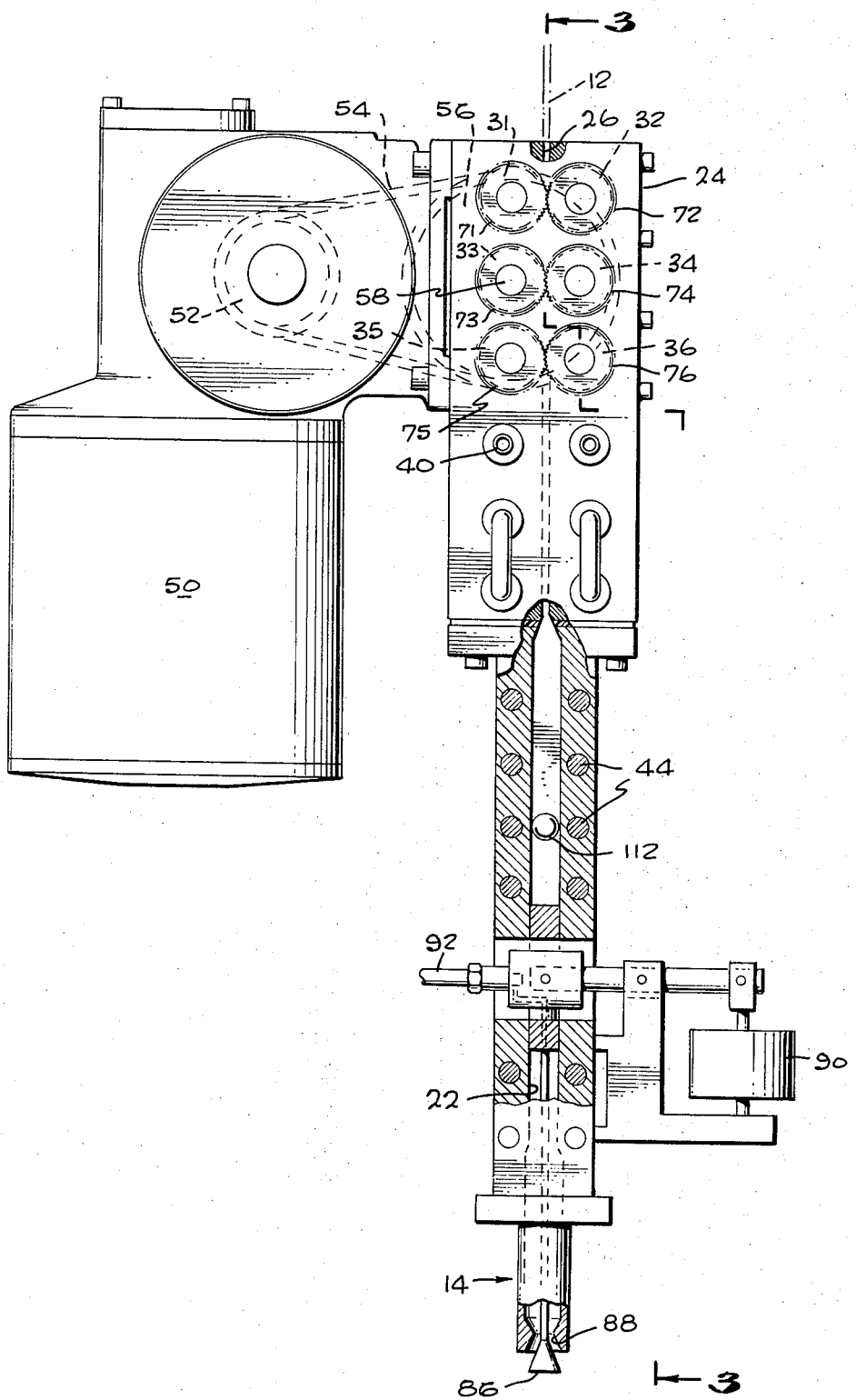
FIG. 2 is a side elevation view of the plastic feeding machine of FIG. 1 showing more details thereof.
Figure 3:
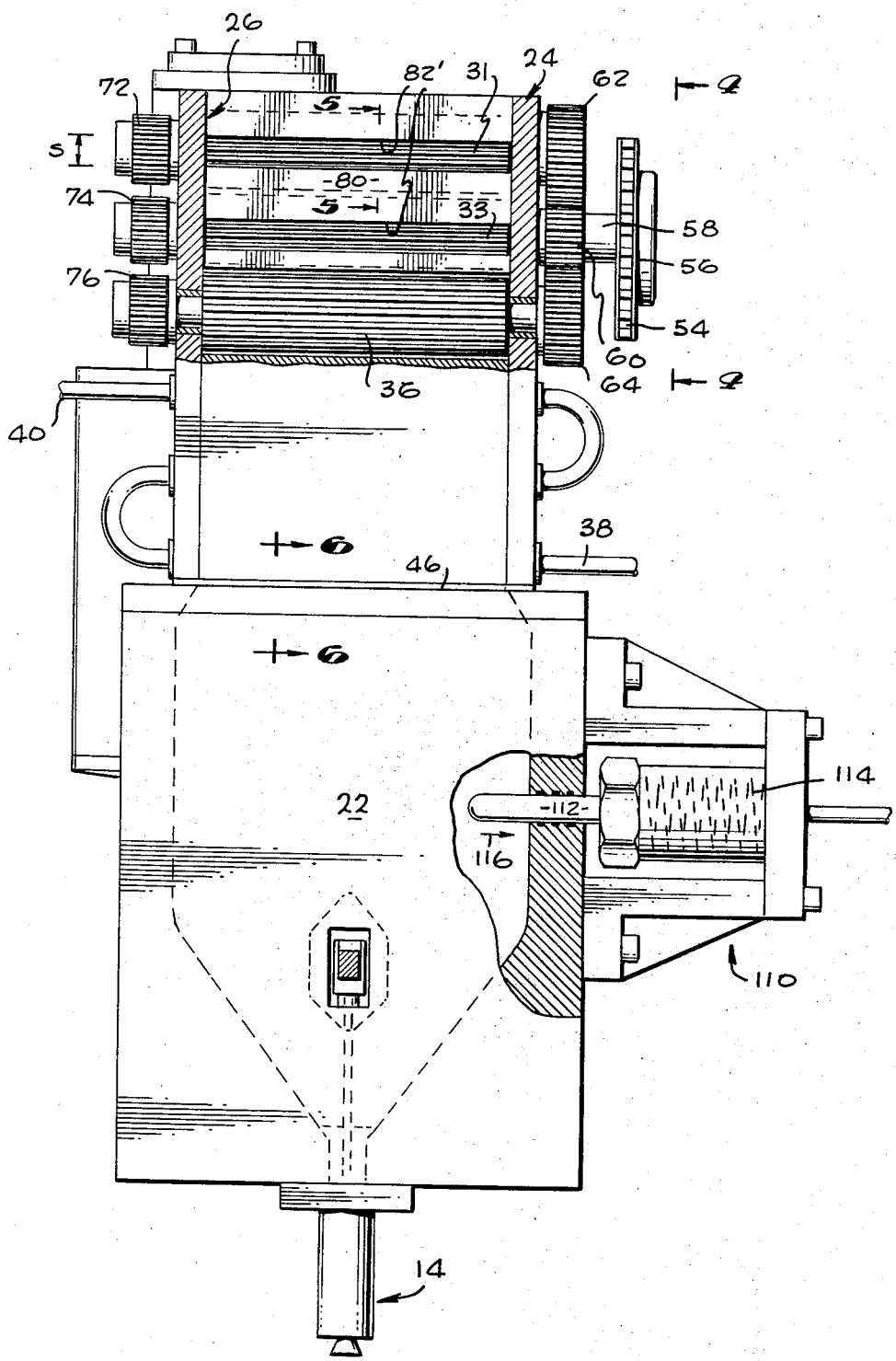
FIG. 3 is a front view, partially in section, taken on the line 3—3 of FIG. 2.
Figure 4:
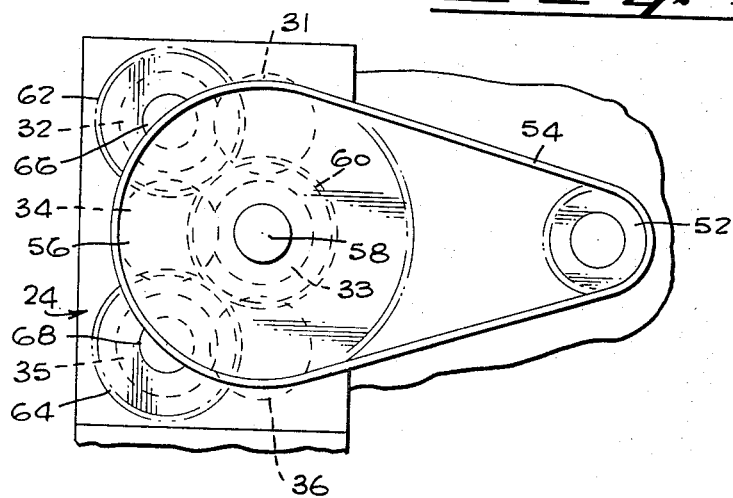
FIG. 4 is a partial side elevation view taken on the line 4—4 of FIG. 3.
Figure 5:
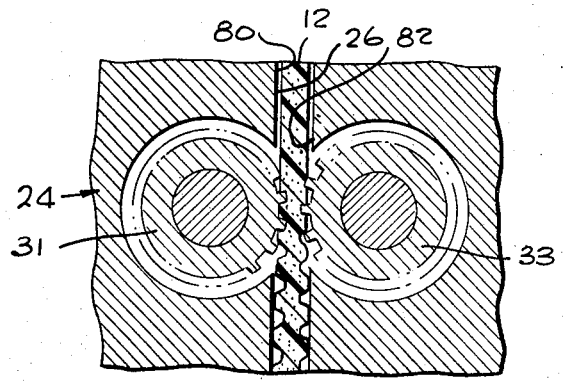
FIG. 5 is a partial sectional side view taken on the line 5—5 of FIG. 3.

FIGS. 2–4 illustrate further details of the machine. The machine includes a gear head drive motor 50 with a sprocket 52 on its output shaft which drives a chain 54. As shown in FIG. 4, the chain 54 drives a large sprocket 56 that is mounted on a roller shaft 58 which carries one of the splined rollers 33 that moves the feedstock. The shaft 58 also carries a gear 60 that drives two other gears 62, 64 that are attached to shafts 66, 68 that carry the splined rollers 32, 35 respectively. In order to drive the remaining splined rollers, each pair of splined rollers is geared together as shown in FIG. 2. Thus, two gears 71, 72 connect the two rollers 31, 32, two gears 73, 74 connect the two rollers 33, 34, while two gears 75, 76 connect the two rollers 35, 36.

Because of the gear drive, all rollers are positively driven at the same peripheral speed without slippage. If desired, the rollers can be positioned so that the splines of the second set of rollers 33, 34 enter depressions formed in the feedstock 12 by the first set of rollers 31, 32, while the last set of rollers, 35, 36 also may be made to enter these depressions. It is not necessary, however, that the splines be arranged in this manner in order to obtain effective driving of the feedstock. Also, if desired, other means capable of engaging large areas of the feedstock and moving same through the passageway may be used, without departing from the spirit and scope of this invention. This may be a pair of moveable belts, for example.

Figure 6:
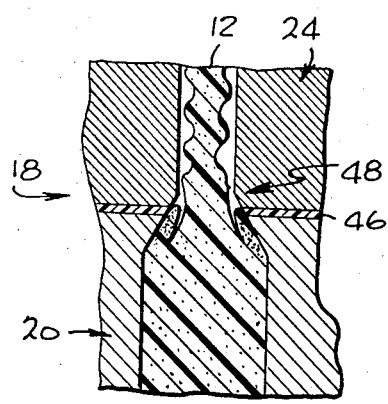
FIG. 6 is a partial sectional side view taken on the line 6—6 of FIG. 3.

The passageway frame portion 24 has a pair of walls 80, 82 on either side of the passageway 26 for closely supporting each side of the strip-shaped feedstock 12. The walls 80, 82 are substantially identical and a portion of the wall 80 being shown in FIG. 3. The wall 80 has slots 82' through which portions of the splined rollers project so that the rollers can engage the feedstock. However, the slots are shorter in lengths along the passageway than the diameter of the rollers, so that only the peripheral portions of the rollers enter the passageway 26. This provides maximum support for the feedstock 12 to minimize buckling which can occur in the feedstock after the first set of rollers 31, 33. Although some buckling of the feedstock 12 is likely to occur, it is minimized by dimensioning the feed path 26 so that the walls closely engage the feedstock. There is a space left between the feedstock and the walls 80, 82 of the passageway, so that it is possible for molten plastic in the hot chamber to leak upwardly around the feedstock. However, as shown in FIG. 6, the molten plastic solidifies along the transition region 48 where it cools to its solidifying temperature, so that liquid plastic cannot flow far in a reverse direction through the feed passageway.

The pipes for carrying cooling water through the passageway portion 24 of the frame are located at the lower region of the passageway portion. Cooling at this lower region with the inlet water at 38 located nearest the insulator 46, helps to assure that solidification of backwardly leaking plastic will occur at the tapered transition region 48. In order to assure that the plastic will be molten in the chamber portion, a series of cartridge heaters 44 is positioned in the frame portion 20.

Figure 7:
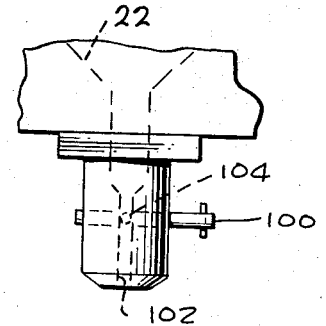
FIG. 7 is a partial side elevation of an alternate nozzle for the machine of FIG. 1.

In many applications, the plastic must be dispensed in small quantities from the heated chamber 22. As shown in FIG. 2, valve apparatus 14 at the bottom of the hot chamber includes a valve member 86 that can be moved against and away from a valve seat 88 to closely control the amount of plastic which is dispensed. The valve apparatus includes an actuator 90 which can move the valve member 86 up and down, and which permits air, from a supply pipe, 92, to flow through the center of the valve member 86 for blow molding. For injection molding, a valve apparatus of the type shown in FIG. 7 can be utilized, which includes a pivotally mounted rod 100 that can block a valve passageway 102 leading from the hot chamber 22, but which can be turned so that a hole 104 in the rod is in line with the passageway 102 to permit the dispensing of molten plastic. A wide variety of valving mechanisms are known, and many of them can be utilized in the present plastic feeding machine without departing from the spirit and scope of this invention.

When the nozzle at the exit of the hot chamber 24 is closed, the splined drive rollers are stopped to prevent the buildup of excessive pressure in the hot chamber. However, the recently admitted cold plastic already in the hot chamber may expand so that there can be a buildup of pressure. To prevent an excessive pressure buildup, a pressure relief apparatus 110 (FIG. 3) is provided. The relief apparatus includes a finger-like plunger 112 which has an end that projects into the hot chamber 22 to occupy some of the volume therein. When the pressure within the chamber exceeds a preset level, the force applied to the end of the plunger 112 is enough to overcome that of a biasing spring 114. This causes the plunger 112 to move in the direction indicated by arrow 116 wherein it occupies less volume in the hot chamber. Such movement enlarges the space that can be occupied by the expanding plastic, to keep the pressure in the hot chamber from rising to an excessive level. Thus, the spring 114 and plunger 112 act as a pressure sensing device that operate to relieve the pressure of the plastic. Instead of relying upon the differential force, between the force applied by the highly pressured plastic on the plunger 112 and the counteracting force of the spring 114 to control expansion, the expansion apparatus can be positively operated in synchronism with the valve 14. Thus, provision can be made so that whenever the valve is closed, the plunger 112 can be automatically withdrawn, and whenever the valve is opened the plunger 112 can be automatically pressed deeper into the chamber.

FIG. 8 illustrates another plastic feeding machine wherein the driving rollers 31-36 are automatically started and stopped in accordance with the pressure in the hot chamber. The machine includes a pressure sensor 120 coupled to the hot chamber region 20 of the frame, which controls a motor relay 122 that can energize and deenergize the roller driving motor 50. Whenever the pressure sensor 120 detects a pressure in the hot chamber exceeding a preset level, it operates the motor relay 122 to stop the flow of energizing currents to the motor 50. The rollers then stop rotating and thus do not feed the feedstock 12 into the chamber. When the pressure within the chamber decreases below another preset level, the sensor allows the motor relay 122 to again energize the motor 50, and the rollers again begin driving the plastic feedstock into the chamber. A separate valve control 124 is provided which can open and close the valve at the outlet of the hot chamber. If desired, the valve control 124 also can be connected to the motor relay 122 to stop the feeding of plastic stock into the hot chamber whenever the valve is closed, so that the motor 50 can be turned off before the pressure rises in the hot chamber. Even though the rollers do not drive the feedstock, the plastic can continue to expand in the hot chamber, and an expansion device of the kind shown at 110 in FIG. 3 may be utilized.

Thus, the invention provides a plastic feeding machine of relatively simple construction and small size, but which can provide considerable quantities of heated plastic under high pressure. The machine includes apparatus such as rollers for engaging a strip-shaped feedstock and forcing it along a feed path towards a hot chamber. Several of such rollers can be positioned in series along the feed path so that each provides only a moderate increment of pressure to the feedstock and yet a very high final pressure can be obtained to force the feedstock into the chamber. The use of a strip-shaped feedstock, preferably at least twice as wide as it is thick, provides many advantages. The strip has a large surface compared to its cross-section, so that a large area can be gripped to force a small amount of the soft feedstock into the hot chamber against high pressure. The large area-to-cross-section ratio also enables rapid and complete heating of the feedstock. The strip feedstock can be drawn from coils with a minimum of material handling equipment. The frame along which the feedstock is moved closely surrounds the feedstock to contain compressive loads. Although molten plastic can leak backwards from the hot chamber around the feedstock, such plastic solidifies prior to moving far along the passageway, and such solidified plastic forms a seal against the outflow of any more plastic. The frame is tapered at the transition region where the plastic solidifies, to prevent blocking of the flow of plastic in the passageway. A valve can be connected to the hot chamber to dispense plastic intermittently. The motor which rotates the driving rollers, or any clutch that couples the motor to the rollers, can be made to shut off automatically whenever the dispensing valve is closed. In addition, or alternatively, a pressure sensor, which senses the pressure of plastic in the hot chamber, can control energization of the motor or any clutch. To prevent excessive pressure build up, even when the rollers are not feeding additional plastic into the hot chamber, an expansion device can be utilized to increase the effective volume of the chamber when the pressure increases.

Although particular embodiments of the invention have been described and illustrated herein, it is recognized that modifications and variations may readily occur to those skilled in the art and consequently, it is intended that the claims be interpreted to cover such modifications and equivalents.

What is claimed is:

1. Plastic extruder apparatus for converting strip plastic feedstock into molten plastic comprising:

first walls defining an intake passage for said strip plastic feedstock, said intake passage having an entrance opening and an exit opening, said intake passage being dimensioned to closely surround said feedstock;

pairs of rollers mounted in said first walls spaced along said passageway, each pair of rollers having a length engaging the surface area of the strip feedstock which is a multiple number of times the spacing between said rollers through which said strip feedstock passes;

second walls defining a heating chamber for said strip feedstock, said heating chamber having an intake opening and an exit opening;

walls defining a tapered transition region joining said exit opening of said intake passage to the entrance opening of said heating chamber, said tapered transition region having a passageway which tapers at a self releasing angle from said intake passage to said heating chamber;

means for rotating said rollers at substantially the same speed to urge said feedstock through said intake passage and into said heating chamber;

means for maintaining said heating chamber walls at a temperature to cause any strip feedstock therein to melt;

means for maintaining said intake passage first walls sufficiently cool to maintain any strip feedstock therein solid, a valve coupled to said exit of said chamber to control the dispensing of plastic therefrom;

expansion means coupled to said heating chamber and operable to expand and contract the effective volume of said heating chamber; and means responsive to the pressure of plastic in said heating chamber and coupled to said expansion means for operating said expansion means at predetermined pressures to expand and contract said chamber.

2. Plastic extruder apparatus as recited in claim 1 wherein said tapered transition region includes insulating means for maintaining a temperature gradient along said region for causing the strip feedstock to transition between solid and liquid states.

3. Plastic extruder apparatus as recited in claim 1 wherein said rollers are splined and the length of said splined rollers is at least twice the spacing therebetween.

4. Plastic extruder apparatus as recited in claim 1 wherein said intake passage walls have spaced slots therein through which the peripheries of said rollers extend for engaging said strip feedstock surface area.

5. Plastic extruder apparatus for converting strip plastic feedstock into molten plastic comprising:

first walls defining an intake passage for said strip plastic feedstock, said intake passage having an entrance opening and an exit opening, said intake passage being dimensioned to closely surround said feedstock;

pairs of rollers mounted in said first walls spaced along said passageway, each pair of rollers having a length comprising the surface area of the strip feedstock which is a multiple number of times the spacing between said rollers through which said strip feedstock passes;

second walls defining a heating chamber for said strip feedstock, said heating chamber having an intake opening and an exit opening;

walls defining a tapered transition region joining said exit opening of said intake passage to the entrance opening of said heating chamber, said tapered transition region having a passageway which tapers at a self releasing angle from said intake passage to said heating chamber;

means for rotating said rollers at substantially the same speed to urge said feedstock through said intake passage and into said heating chamber;

means for maintaining said heating chamber walls at a temperature to cause any strip feedstock therein to melt;

means for maintaining said intake passage first walls sufficiently cool to maintain any strip feedstock therein solid;

a valve positioned at said exit opening of said heating chamber to control the dispensing of plastic therefrom;

sensing means for sensing the pressure of plastic in said chamber; and means responsive to said sensing means and coupled to said drive means for terminating rotation of said rollers when the sensed pressure in said chamber exceeds a predetermined level.

6. Plastic extruder apparatus as recited in claim 5 wherein there is included means at the exit opening of said heating chamber actuable for closing said exit opening and for terminating the operation of said means for rotating said splined rollers therewith.

* * * * *